US009956836B2

(12) United States Patent
Batiste (10) Patent No.: US 9,956,836 B2
(45) Date of Patent: May 1, 2018

(54) FLEXIBLE TRAILER HITCH RECEIVER DISPLAY SIGN (71) Applicant: Rene Carl Batiste, Las Vegas, NV (US)

(72) Inventor: Rene Carl Batiste, Las Vegas, NV (US)

( * ) Notice: Subject to any disclaimer, the term of this patent is extended or adjusted under 35 U.S.C. 154(b) by 0 days. days.

(21) Appl. No.: 15/594,531

(22) Filed: May 12, 2017

(65) Prior Publication Data
US 2017/0326931 A1 Nov. 16, 2017

Related U.S. Application Data (60) Provisional application No. 62/336,223, filed on May 13, 2016.

(51) Int. Cl.
G09F 7/18 (2006.01)
B60D 1/60 (2006.01)
G09F 21/04 (2006.01)

(52) U.S. Cl.
CPC ............. B60D 1/60 (2013.01); G09F 7/18 (2013.01); G09F 21/04 (2013.01); G09F 2007/1865 (2013.01)

(58) Field of Classification Search
CPC .......... G09F 21/04; G09F 13/00; B60D 1/28; B60D 1/36; B60D 7/00; B60D 1/00
USPC ....... 40/591; 280/507; 296/21; 24/563, 67.9; D12/162; D8/40; D19/65, 34
See application file for complete search history.

(56) References Cited

U.S. PATENT DOCUMENTS

| 2,609,629 | A | * | 9/1952 | Hubbard | A44B 9/18 116/234 |
| D241,342 | S | * | 9/1976 | Carroll et al. | D19/34 |
| 5,406,726 | A | * | 4/1995 | Fan | A44C 3/001 40/1.5 |
| D368,059 | S | * | 3/1996 | Barth | D12/162 |
| 5,549,316 | A | | 8/1996 | Jones | |
| 5,603,178 | A | | 2/1997 | Morrison | |
| 5,979,094 | A | | 11/1999 | Bradford | |
| 6,253,476 | B1 | * | 7/2001 | Powell | B60R 13/105 280/507 |
| 6,412,202 | B1 | | 7/2002 | Oswood | |
| 6,418,650 | B1 | | 7/2002 | Kiewald | |
| 6,463,686 | B1 | | 10/2002 | Eisenbraun | |
| 6,553,697 | B1 | | 4/2003 | Pichan | |
| 6,662,948 | B1 | * | 12/2003 | Velliquette | B65D 73/0021 206/462 |
| 6,694,651 | B1 | * | 2/2004 | Shuen | G09F 21/04 40/591 |
| 6,910,705 | B1 | | 6/2005 | Harwood et al. | |
| 7,171,773 | B2 | | 2/2007 | Haggard, Jr. | |

(Continued)

Primary Examiner — Cassandra H Davis
(74) Attorney, Agent, or Firm — Connie R. Masters (57) ABSTRACT A flexible decorative display device for attachment to a hitch receiver. The flexible display device is formed from a bendable sheet having a distal front surface, a proximal rear surface, an outer shaped outline, and interior shaped edges. The interior shaped edges form both a central opening to accommodate the trailer hitch receiver and a tongue. The tongue has tongue alignment cavity edges that define an interior tongue pin-receiving cavity. The tongue bends backwardly at a flexure line to fold back over the outside of the receiver tube, aligning the tongue pin-receiving cavity with the pin-receiving hole of the receiver.

8 Claims, 7 Drawing Sheets (56) References Cited

U.S. PATENT DOCUMENTS

| | | | |
|---|---|---|---|
| 7,204,507 B1 | 4/2007 | James | |
| 8,261,473 B2 | 11/2012 | Bey et al. | |
| 2001/0030409 A1 | 10/2001 | Williams | |
| 2002/0033587 A1* | 3/2002 | McConnell | B60D 1/60 280/504 |
| 2002/0166497 A1* | 11/2002 | Rae | B42D 9/005 116/237 |
| 2003/0121192 A1 | 7/2003 | McPheters | |
| 2005/0121880 A1 | 6/2005 | Santangelo | |
| 2005/0217155 A1 | 10/2005 | Santa Cruz | |
| 2007/0089337 A1 | 4/2007 | Van Kehrberg | |
| 2009/0051178 A1 | 2/2009 | Redden | |
| 2009/0064552 A1 | 3/2009 | Columbia | |
| 2011/0167688 A1 | 7/2011 | Frost | |
| 2012/0090206 A1 | 4/2012 | Prescott | |
| 2012/0313343 A1 | 12/2012 | Fletcher | |

* cited by examiner

FLEXIBLE TRAILER HITCH RECEIVER DISPLAY SIGN

CROSS-REFERENCE TO RELATED APPLICATIONS

This nonprovisional application claims the benefit of U.S. Provisional Patent Application Ser. No. 62/336,223, filed on May 13, 2016, which is incorporated herein in its entirety.

FIELD OF INVENTION

This invention relates generally to mobile visual advertising or signs, and, more particularly, to a sign designed to be mounted on a hitch receiver of a land vehicle whereby information or an interesting image is displayed to an observer.

BACKGROUND OF THE INVENTION

Many pickup trucks and sports utility vehicles (SUV's) are equipped with a towing package that includes a hitch to allow the vehicle to tow trailers of various types, such as utility trailers, pop-up travel trailers, horse trailers, etc. The hitch is installed securely to the underside or bumper at the back of the towing vehicle with a tubular hitch receiver extending outwardly (distally) from the center of the rear of the vehicle. The hitch receiver, a square metal tube (typically having a 1.24 inch, 2 inch, or 2.5-inch central opening), is configured to receive a metal ball mount, usually of steel or aluminum.

The distal portion of the ball mount has a hole that receives a hitch ball that serves to connect the hitch with the coupler on the trailer that is to be pulled. The proximal portion of the ball mount is a square metal tube sized to be inserted into the open cavity at the distal end of the square metal receiver tube. The receiver and ball mount are both configured with opposing side holes that, when the ball mount is inserted into the receiver tube, are aligned for receiving a pin. After the pin is inserted through the first set of aligned holes on the first sides of the receiver and ball mount, it is pushed through the open receiver tube and inserted through the second set of aligned side holes on the opposing sides of the receiver and the ball mount. It is then typically secured by a clip, but it may be locked with a locking mechanism.

When the hitch is not in use, the ball and ball mount are often removed to significantly reduce the distance the hitch assembly projects distally from the towing vehicle; this reduction in the outward projection reduces accidental injury or damage to the hitch assembly or to other objects and to people. The ball and ball mount are easily removed by removing the pin from the two sets of aligned holes on the sides of the ball mount and receiver, and then pulling the ball mount from the inside of the receiver.

Because hitches are quite common on various towing vehicles, there has been significant demand for decorative items that are attachable to the hitch. Some conventional decorative hitch items are designed to cover the ball when the ball and ball mount are installed in the receiver. Additionally, numerous tube-inserted devices have been developed that are inserted into the open cavity at the distal end of the square metal receiver tube after the removal of the ball mount with the ball, since it is easy, advantageous, and common to remove the ball mount and ball when not in use.

These decorative tube-inserted prior art devices serve the purpose of concealing the open cavity and the metal edges of the tube that are left exposed when the ball mount is removed, but these tube-inserted prior art devices have disadvantages. All the tube-inserted devices suffer from the disadvantage that they must be removed when the ball mount is inserted. It requires time and effort to remove, store, and to reinstall the tube-inserted device upon removal of the ball and ball mount. Further, during the time the tube-inserted device is not in use it may become lost or damaged and, thus, prevent reinstallation when the ball mount is again removed after usage. Additionally, many of these tube-inserted devices are formed of multiple pieces that are complicated and/or costly to manufacture, that tend to break, and that are easily lost when the device is stored during usage of the ball mount and ball. Some of the tube-inserted devices are not easy to install.

Accordingly, there is a need for a device that adds an aesthetic element to the receiver and does not have to be removed whether the ball mount and ball are installed or not installed, and yet is easy to install, is easy and economical to manufacture, and is formed of a single piece of material.

BRIEF SUMMARY OF THE INVENTION

The present invention is directed to a flexible decorative display device or sign that is attachable to a hitch receiver to create an interesting display or to add interest and, when the towing vehicle is moving, to interact with the wind to create an illusion of movement that further enhances the aesthetics and appeal of the display. The flexible display device is formed of a single bendable sheet having a rear surface; a front surface; a graphical representation disposed on the front surface; a shaped outline (outer perimeter) coordinating with and enhancing the design of the graphical representation; interior shaped edges that form a central opening and that form, in combination with folding, a tongue; and tongue cavity edges defining a tongue pin-receiving cavity within the interior of the tongue.

The interior shaped edges comprise one vertical edge, opposing top and bottom horizontal edges, a vertical side boundary opposing the vertical edge, corner edges that join the vertical edge to the horizontal edges and the horizontal edges to the vertical side boundary, and tongue-defining edges that define the outer boundaries of the tongue.

In one aspect of the invention, the corner edges are convexly enlarged or recessed to create relief corners that allow the display sign to be stretched over the receiver, but allow the central opening to fit snuggly against the receiver.

To install the flexible display device when no ball mount and ball is installed, the tongue is bent inwardly to form the central opening. Next, while guiding the tongue backwardly over the exterior of the receiver tube, the top of the central opening is fitted over the top of the hitch receiver, and then the bottom of the central opening is fitted over the bottom of the hitch receiver, or vice versa. The tongue pin-receiving cavity is positioned in alignment with the pin-receiving hole on one side of the receiver. A pin is then inserted into the tongue pin-receiving cavity and through the first pin-receiving hole of the receiver, across the interior space of the receiver, and through the opposing second pin-receiving hole of the receiver to be fastened with a clip or lock.

An object of the present invention is to provide a flexible trailer hitch receiver display sign that has a decorative or informative display visible around the receiver.

An additional object of the invention is to provide a flexible trailer hitch receiver display sign that is economical to manufacture.

A further object of the present invention is to provide a flexible trailer hitch receiver display sign that is easy to install.

Another object of the present invention is to provide a flexible trailer hitch receiver display sign that is formed from a single piece of material.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Shown throughout the figures, the present invention is directed toward a flexible trailer hitch receiver display sign formed from a single sheet of flexible material that adds interest, displays information, or aesthetically enhances the receiver of a towing vehicle and that, while the towing vehicle is traveling, provides the perception of action or movement of outer portions of the display sign.

Figure 1:
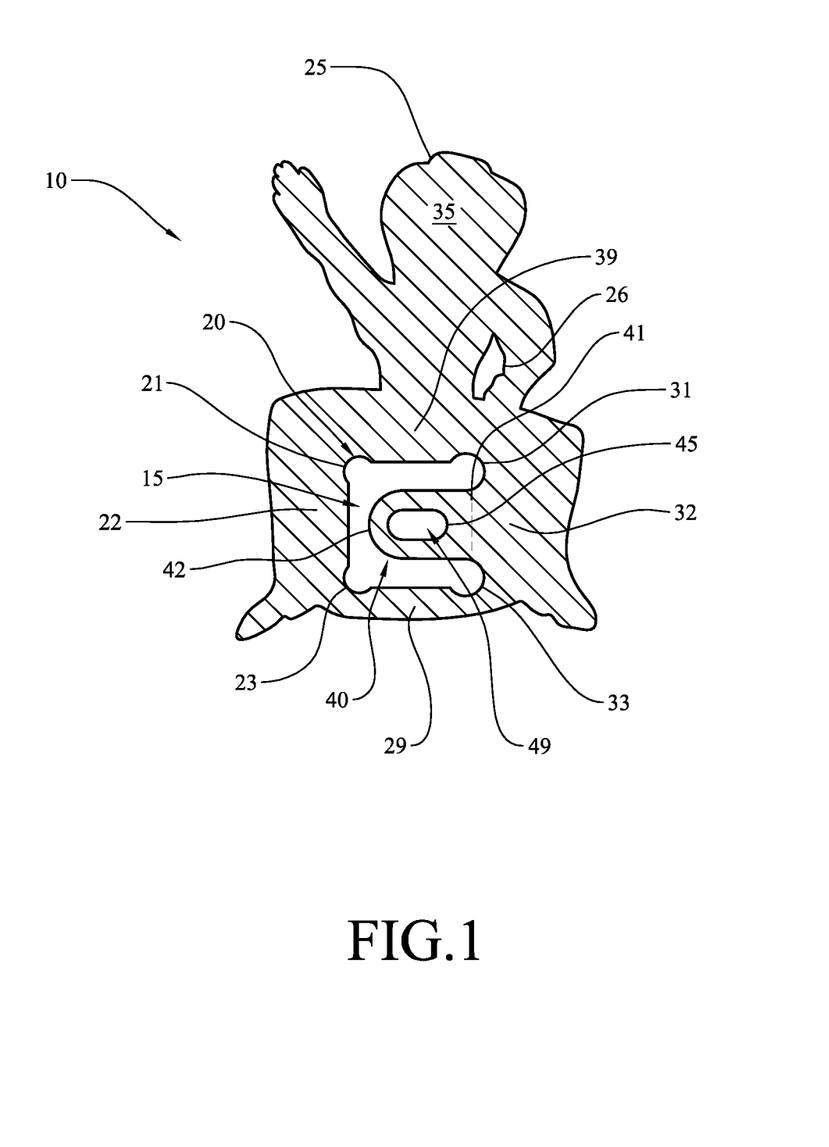
FIG. 1 is a front view of an embodiment of the flexible display sign for a trailer hitch receiver of the present invention showing the tongue extending inwardly into the central opening it its initial inwardly-extending position.
Figure 2:
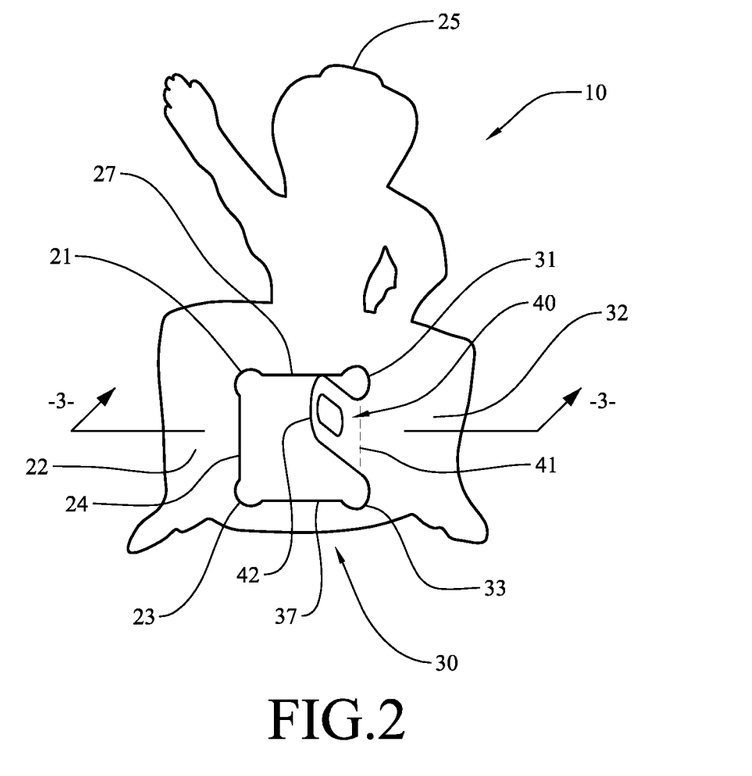
FIG. 2 is a front view of an embodiment of the flexible display sign for a trailer hitch receiver of the present invention showing the tongue bent at the flexure line to open up the central opening and to position the tongue in its backwardly-extending position, as during installation.

Referring now to FIGS. 1-2, a flexible trailer hitch receiver display sign, shown generally as reference number 10, is illustrated in accordance with a preferred embodiment of the present invention. As shown, the flexible trailer hitch receiver display sign 10 comprises a single bendable sheet from which a sign body 30 (FIG. 2) and an attached tongue 40 are formed. The display sign 10 comprises a front surface 35; a rear surface 38 (FIG. 3); a shaped outline 25; interior shaped edges 20 that, in combination with folding, form both a central opening 15 and a tongue 40; and tongue alignment cavity edges 45 forming a tongue pin-receiving cavity 49 for alignment with a pin-receiving side hole 64 (FIGS. 7, 9) of a hitch receiver 61 (FIGS. 7, 9-10) of the hitch assembly 63 attached to the towing vehicle 60. The tongue 40 is folded backwardly along a flexure line 41 toward the towing vehicle 60 (FIG. 9) along the outside of the receiver 61 with the tongue's pin-receiving cavity 49 aligned with the pin-receiving hole 64 on the side of the receiver 61. When in this position, it is fastened to the receiver 61 with a pin 62. At times when the receiver 61 has the ball mount 67 inserted into the interior of the receiver 61 the tongue pin-receiving cavity 49 is aligned both with the receiver pin-receiving hole 64 and the pin-receiving hole 66 (FIGS. 5, 10) of the ball mount 67 and fastened with a pin 62.

As seen in FIG. 2, the interior shaped edges 20 comprise a top horizontal edge 27, an opposing bottom horizontal edge 37; a vertical edge 24; tongue contour edges 42 defining the inwardly-extending tongue 40; a first top corner edge 21 disposed between a first side of the top horizontal edge 27 and the top of the vertical edge 24; a first bottom corner edge 23 disposed between the bottom of the vertical edge 24 and the first side of the bottom horizontal edge 37; a second top corner edge 31 disposed between the second side of the top horizontal edge 27 and the tongue contour edges 42; and a second bottom corner edge 33 disposed between the second side of the bottom horizontal edge 37 and the tongue contour edges 42. In the illustrations, the first side of the top and bottom horizontal edges 27, 37 is the left side, but the flexible display sign 10 can equally well be made in a mirrored or vertically flipped (not shown) manner of construction.

The shaped outline edges 25 are fashioned in a pattern that coordinates with and/or outlines the figure, motif, or ornamentation of the graphical representation applied to the front surface 35. The shaped outline 25 comprises a full perimeter outline of the two-dimensional shape and may also comprise one or more inner outlines 26, such as the edges defining a hole between the arm and the body of the cowboy figure of FIGS. 1, 2, 4. The front surface 35 is preferably substantially flat without marked projections or depressions, but in an aspect of the invention, projections or depressions may be used to emphasize characteristics of the graphical representation 36.

The central opening 15 is sized and shaped to accommodate the receiver 61; therefore, the opening 15 is generally a square opening having a height and width generally equal to, or slightly less than, the height and width of the square receiver 61 to be inserted into central opening 15. In the aspect in which the flexible display sign 10 is configured with convex-shaped corners 21, 23, 31, 33, the height and width is preferably slightly smaller than the height and width of the receiver 61, with a small upturned portion 59 (FIG. 7) of the inner edges 24, 27, 37 bent backwardly along the receiver 61, which further secures the inner portion of the display sign 10 to the receiver 61 while allowing the outer portions to move in the tailwind currents when the vehicle is traveling.

The central opening 15 is formed by the top horizontal edge 27, the bottom horizontal edge 37, the vertical edge 24, the corner edges 21, 23, 31, 33, and a vertical side boundary disposed substantially at the flexure line 41. The flexure line 41 extends vertically between a portion of the upper corner edge 31 and a portion of the lower corner edge 33. The vertical side boundary is formed at flexure line 41 when the tongue 40 is folded backwardly at flexure line 41 changing the inwardly-extending tongue 40 of the unfolded structure to a backwardly-extending tongue of the installed structure, i.e., the tongue is bent backward (toward the towing vehicle) at the flexure line at the vertical side boundary.

The flexible display sign 10 comprises an upper portion 39 (FIG. 1) disposed between the top horizontal edge 27 and the upper portion of the shaped outline 25, a left side portion 22 disposed between the vertical edge 24 and the left lateral portion of the shaped outline 25, a lower portion 29 disposed between the bottom horizontal edge 37 and the bottom portion of the shaped outline 25, and a right side portion 32 disposed between the flexure line 41 and the right lateral portion of the shaped outline 25.

Figure 3:
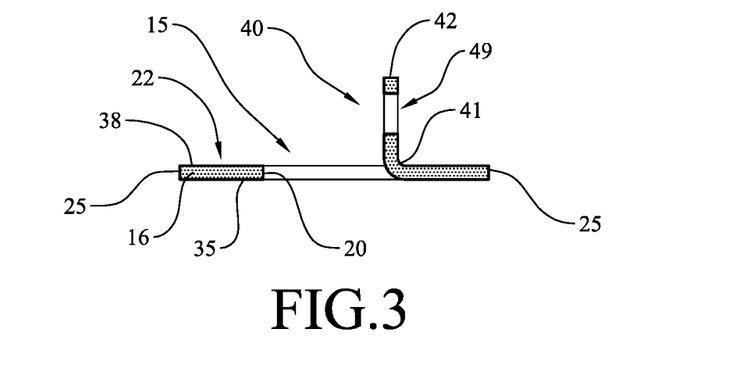
FIG. 3 is a cut view of an embodiment of the flexible display sign for a trailer hitch receiver of the present invention showing the tongue bent backward at the flexure line in the backwardly-extending position for installation.

The tongue 40 is defined by the tongue contour edges 42, which include a tongue top edge, a tongue tip edge, and a tongue bottom edge. The top and bottom edges are illustrated as substantially horizontal, while the tongue tip edge is illustrated as rounded and generally semicircular, but other shapes or outlines may be fabricated based on design and aesthetic reasons. For example, the tongue tip edge could be formed with scallops (not show) to represent a flower pattern, could be formed as a rectangle, or could be formed in other angular or rounded shapes. As seen in FIGS. 2-3, when the flexible display sign 10 is ready to install (or in use), the tongue 40 is folded backwardly at substantially a ninety-degree angle at flexure line 41.

The tongue interior pin-receiving cavity 49 is illustrated as a rounded oval shape with the length of the oval accommodating some variation in the distance of the receiver pin-receiving hole 64 from the distal end of the receiver. However, other shapes are within the scope of the invention, such as circular, hexagonal, rectangular, and the like.

Figure 4:
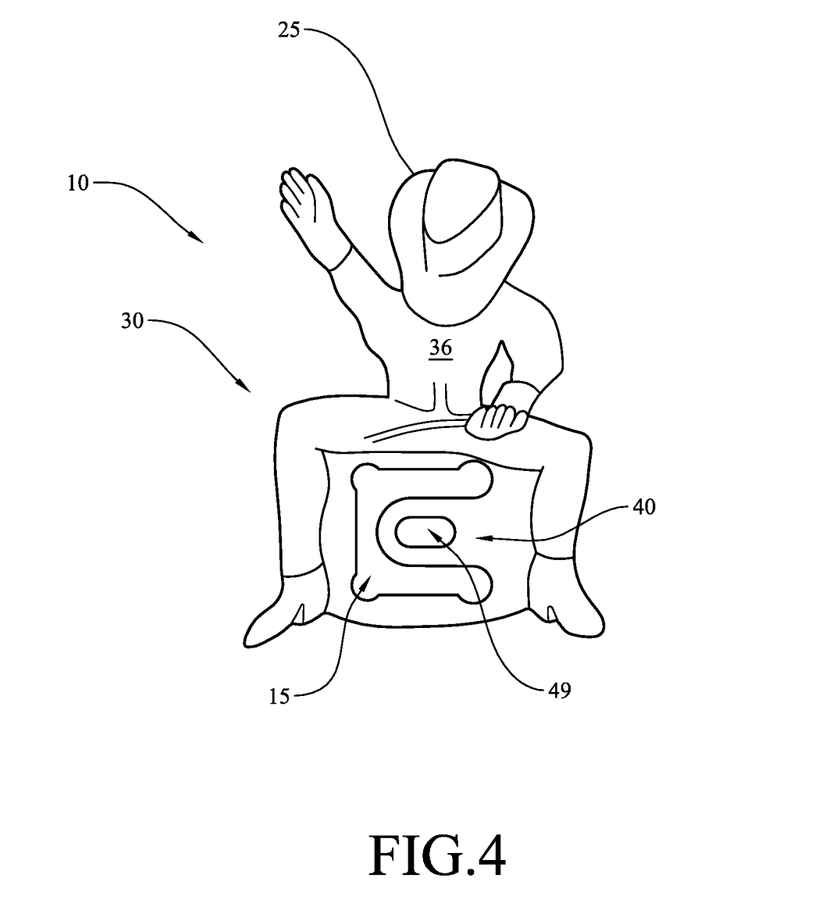
FIG. 4 is the front view of the flexible display sign for a trailer hitch receiver of the present invention as seen in FIGS. 1-2, but showing a graphical representation applied to the front surface that coordinates with the shaped outline.

FIG. 4 shows the same shaped outline 25 design as in FIGS. 1-2, but shows a graphical representation 36 applied to the front surface 35. The graphical representation 36 may be integrally formed with the medial portion 16 and rear surface 38 or may be permanently affixed to the front surface 35. The graphical representation 36 may be any of a wide variety of designs that can be imagined or imitated from nature or life. For example, it may be an animal figure (such as the shark of FIG. 4, turtle, bear, or the like), may be a figure of an object (such as a pyramid, street sign, or the like), may be a figure of a person (such as a cowboy riding as in FIG. 4, a head as in FIG. 6, or the like), may be a sign with lettering to convey a message (such as "Back Off," "Smith for President," "Baby on Board," or the like), may be a motif (such as a Greek key design, filigree design, or the like), or may be imaginary characters (such as cartoon characters or fantasy characters).

Figure 5:
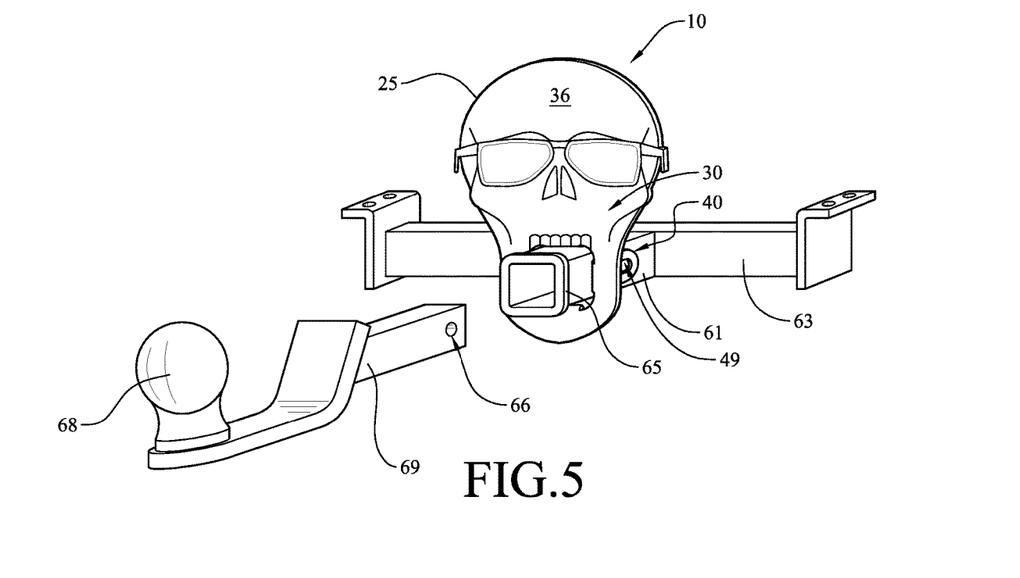
FIG. 5 is a front perspective view of an embodiment of the flexible display sign for a trailer hitch receiver of the present invention showing the tongue extending backwardly along the outside of the receiver ready to receive a pin and with the ball mount and ball ready for insertion into the open tube of the receiver.

FIG. 5 illustrates an installed flexible display sign 10 with the tongue 40 bent to extend backwardly along the outside of the receiver 61. The tongue interior pin-receiving cavity 49 is aligned with the pin-receiving hole 64 (FIGS. 7-9) of the receiver 61. The ball mount 67 (carrying ball 68) is in position to be inserted into the open interior aperture of the receiver 61.

Figure 6:
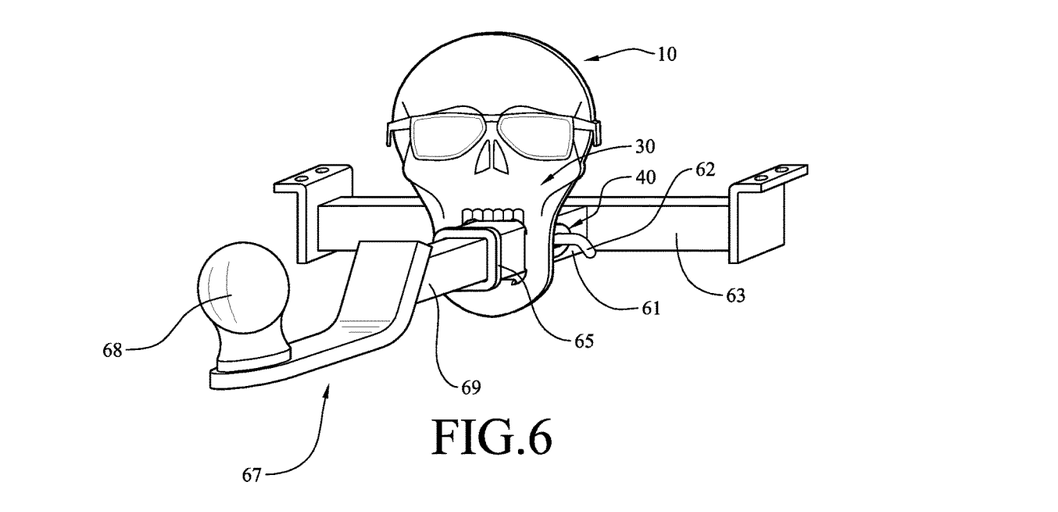
FIG. 6 is a front perspective view of an embodiment of the flexible display sign of the present invention showing the invention in an environment of use in which the ball mount is inserted into the receiver, in which the tongue extends backwardly along the outside of the receiver with the pin-receiving cavity of the tongue aligned with the pin-receiving hole of the receiver and also aligned with the pin-receiving hole of the ball mount and, additionally, with a pin inserted through the aligned cavity and the two holes to secure the ball mount in the interior of the receiver and the flexible display sign on the exterior of the receiver.

When the ball mount 67 is inserted into the interior aperture of the tube receiver 61, as in FIG. 6, the pin-receiving hole 66 of the rear tube 69 of the ball mount 67 is interior of and aligned with the pin-receiving hole 64 of the receiver tube 61. As also seen in FIG. 6, the pin-receiving cavity 49 of the tongue 40 is exterior of and aligned with the pin-receiving hole 64. A pin 62 is inserted through the three aligned open spaces 49, 64, 66 to secure the ball mount 67 inside the receiver 61 and the flexible display sign 10 outside the receiver 61.

Figure 7:
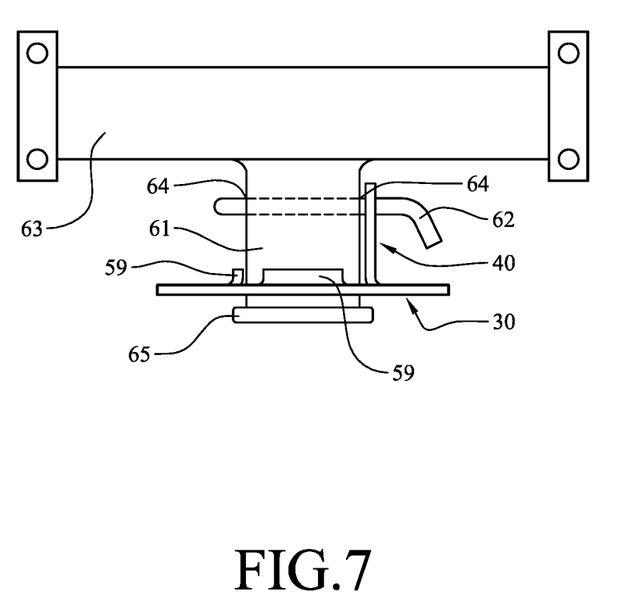
FIG. 7 is a top view of an embodiment of the flexible display sign of the present invention showing the tongue extending backwardly along the outside of the receiver and secured by a pin in an environment of use in which the ball mount is not installed.

Though FIG. 6 illustrates the flexible display sign 10 installed when the ball mount 67 is also installed, the display sign 10 may equally well be installed when the ball mount 67 is not installed, as shown in FIG. 7. FIG. 7 also illustrates that the display sign 10 is generally installed behind a receiver tube ring 65, which is disposed at the distal end of the receiver 61. The receiver tube ring 65 is a typical part of a receiver 61.

FIGS. 5-6 illustrate another possible display sign design having a graphical representation 36 disposed on the front surface 35 and coordinated with a shaped outline 25. In this particular design, the center of the head (mouth area) is held firmly by the edges of the interior shaped edges 20 and the tongue 40 to the receiver 61, while the forehead is further from the attachment points and is, therefore, free to move in the wind to imply that the forehead is nodding.

Figure 8:
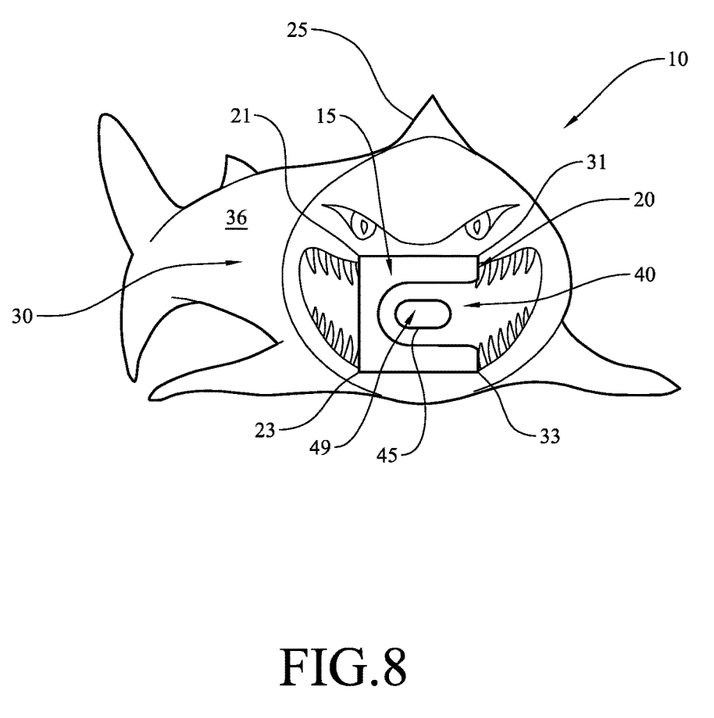
FIG. 8 is a front view of the flexible display sign for a trailer hitch receiver of the present invention showing that the graphical representation applied to the front surface of the flexible display sign and the shaped outline edges may vary based on design aesthetics and showing an aspect of the invention in which the corners are square instead of convex or recessed.

FIG. 8 illustrates an aspect of the invention in which the corners 21, 23, 31, 33 are squared corners, as opposed to the convex corners 21, 23, 31, 33 of FIGS. 1-2. FIG. 8 also illustrates another one of the wide variety of graphical representations 36 coordinated with a shaped outline 25 that together provide visual appeal and/or provide a written message viewable from the back of the vehicle 60 at times when the receiver 61 is viewable. In this particular design, the area of the teeth of the shark is held firmly by the edges of the interior shaped edges 20 and the tongue 40 to the receiver 61, while the tail is free to twist and wriggle in the wind, thus providing the perception that the shark is swimming behind the moving vehicle. Other life-like movements may be created by the wind with other graphical representations 36 and shaped outlines 25.

The flexible display sign 10 may be formed of a natural or manmade sheet material that is not rigid, but is flexible or bendable (has a low modulus of elasticity). The material preferably has a polyester fabric face with open cell rubber and may be in the range of from 1 to 7 mm in thickness, which is a small fraction of the width and height of the display sign whose width and height may be in the range of 15-50 cm. The graphical representation 36 may be applied to the front face 35 by techniques that are known in the art, such as dye sublimation, transfer printing, lamination, and silk screening. The rubber backing may typically be made of lower density rubber composites, such as open cell styrene, butadiene rubber or styrene-butadiene rubber or other synthetic rubber. However, other materials may be used for the backing, such as neoprene, silicone or composite materials. Alternatively, the front surface 35, medial portion 16, and rear surface 38 may be formed unitarily, such as formed of a rubber sheet.

To manufacture the flexible display sign 10, a graphical representation 36 and coordinating shaped outline 25 are chosen along with a design for the interior shaped edges 20 that may or may not coordinate with the graphical representation 36. A sheet of flexible material is cut along the shaped outline 25 and along the interior shaped edges 20. The graphical representation 36 may be applied before or after cutting the material. The material is cut using a conventional technique.

Figure 9:
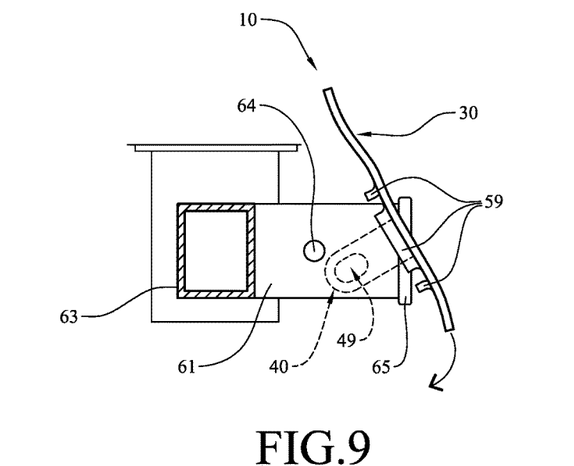
FIG. 9 is a side view of a step in the installation of the flexible display sign for a trailer hitch receiver of the present invention.
Figure 10:
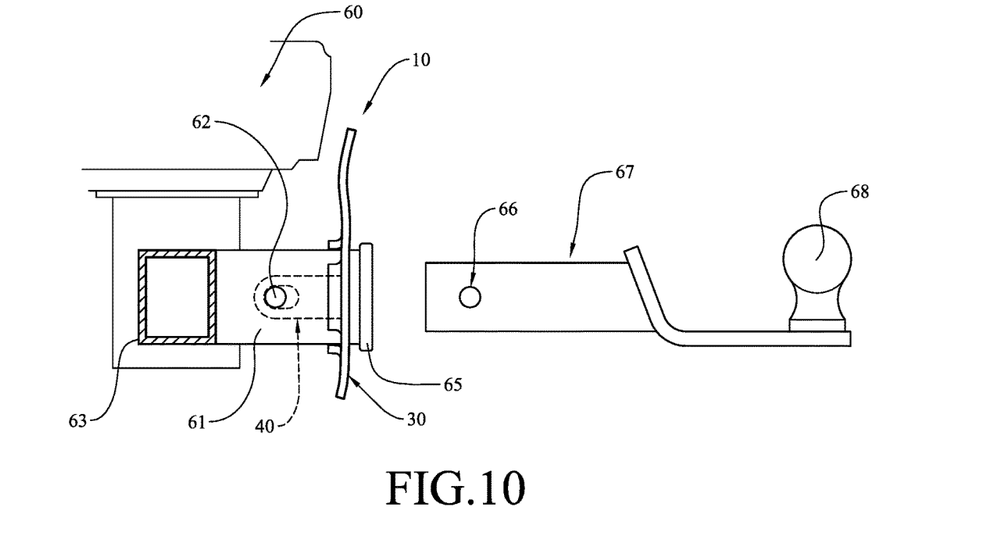
FIG. 10 is a side view of an step in the installation of the flexible display sign of the present invention when a ball mount is also to be installed.

To use the flexible display sign 10, the user bends the tongue 40 backwardly at the flexure line 41, as seen in FIGS. 2-3. Then, as seen in FIG. 9, the user then positions a portion (shown in FIG. 9 as the top) of the central opening 15 over the protruding receiver tube ring 65 while ensuring that the small upturned portions 59 of the inner edges 24, 27, 37 are bent backwardly along the receiver 61, and that the tongue 40 is extending backwardly to be overlaid along the exterior of the receiver 61. The tongue pin-receiving cavity 45 is brought into alignment with the receiver pin-receiving hole 64 while the remainder of the central opening is stretched over the remaining portion of the receiver tube ring 65 to bring the display sign 10 into the installed position illustrated in FIG. 10, in which the display sign 10 is snuggly fitted onto the receiver 61 behind the receiver tube ring 65. If no ball mount 67 is to be installed, the pin 62 is inserted through the aligned tongue pin-receiving cavity 45 and the receiver pin-receiving hole 64, as seen in FIG. 7. If the ball mount 67 is to be installed, it is pushed into the interior cavity of the receiver 61, which aligns the ball mount pin-receiving hole 66 with the previously aligned tongue pin-receiving cavity 45 and receiver pin-receiving hole 64; pin 62 is then inserted through the three aligned holes through the interior cavity of the receiver and then through the opposing receiver pin-receiving hole 64 and ball mount pin-receiving hole 66. A clip or lock (not shown) may be used to hold the pin 62 in this location.

When the user decides to remove the ball mount 67, the clip is removed, the pin 62 is slid out in the reverse of the insertion method, and the ball mount 67 can be removed from the interior of the receiver 61. The display sign remains on the outside of the receiver 61, and the pin 62 can be reinserted to re-secure the display sign 10.

Thus, the display sign 10 of the present invention differs from the prior art in that it can remain installed while the ball mount 67 is installed and/or uninstalled. It also differs in that it is easily and economically formed from a single sheet of material. The display sign 10 additionally provides two attachment means, which utilize the central opening 15 and the tongue pin-receiving cavity 49.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method of installing a decorative device onto a receiver of a hitch assembly, comprising:
    obtaining a flexible display sign comprising a decorative front surface; a shaped outline defining a perimeter of said flexible display sign; interior shaped edges that define a tongue and that define, in combination with folding, a central opening; and tongue alignment cavity edges defining a tongue pin-receiving cavity; and
    fitting said central opening over said receiver.

2. The method of installing a decorative device onto a receiver of a hitch assembly, as recited in claim 1, wherein said receiver comprises two pin-receiving hole edges defining two pin-receiving holes disposed on opposing sides of said receiver; the method further comprising:
    folding said tongue backwardly to align said tongue pin-receiving cavity with one of said receiver pin-receiving holes.

3. The method of installing a decorative device onto a receiver of a hitch assembly, as recited in claim 2, further comprising:
    inserting a pin through the aligned said tongue pin-receiving cavity and said one of said receiver pin-receiving holes.

4. The method of installing a decorative device onto a receiver of a hitch assembly, as recited in claim 3, further comprising:
    turning a portion of three of said interior shaped edges backwardly to form three thin upturned edge portions; and
    manually positioning said three upturned edge portions backwardly along said receiver.

5. The method of installing a decorative device onto a receiver of a hitch assembly, as recited in claim 1, wherein said receiver comprises an interior cavity and first and second receiver pin-receiving hole edges defining first and second pin-receiving holes disposed on opposing sides of said receiver; and wherein said hitch assembly comprises a ball mount; and wherein said ball mount comprises first and second pin-receiving hole edges defining a first and a second ball mount pin-receiving hole disposed on opposing sides of said ball mount; the method further comprising:
    folding said tongue backwardly to align said tongue pin-receiving cavity with said first one of said receiver pin-receiving holes;
    inserting said ball mount into said receiver to align said first and second receiver pin-receiving hole edges with said first and second ball mount pin-receiving edges; and
    inserting a pin through said first ball mount pin-receiving hole, then through said tongue pin-receiving cavity, then through said first receiver pin-receiving hole, then across said receiver interior cavity, then through said second receiver pin-receiving hole, and then through said second ball mount pin-receiving hole.

6. The method of installing a decorative device onto a receiver of a hitch assembly, as recited in claim 1, wherein:
    said receiver has a receiver height and width;
    said central opening has a height and width;
    said central opening height is less than said receiver height; and
    said central opening width is less than said receiver width.

7. The method of installing a decorative device onto a receiver of a hitch assembly, as recited in claim 1, wherein said display sign is formed of a single sheet of material having a fabric face backed by open cell rubber.

8. The method of installing a decorative device onto a receiver of a hitch assembly, as recited in claim 1, wherein said display sign is formed of a single sheet of rubber material.

* * * * *